United States Patent Office 3,309,434
Patented Mar. 14, 1967

3,309,434
PROCESS FOR THE FABRICATION OF BODIES FORMED BY DISPERSION OF REFRACTORY MATERIAL WITHIN A PYROCARBON MATRIX WHICH IS IMPERVIOUS TO GASES
Pierre Blum and Louis Bochirol, Grenoble, and Claude Moreau, Seyssinet-Pariset, France, assignors to Commissariat a l'Energie Atomique, Paris, France
No Drawing. Filed Oct. 6, 1964, Ser. No. 401,986
Claims priority, application France, Oct. 17, 1963, 950,932; Aug. 14, 1964, 985,295
6 Claims. (Cl. 264—.5)

The present invention has for its object a process for the fabrication of bodies formed by dispersion of refractory material within a carbonaceous matrix which is impervious to gases.

It is known that the properties exhibited by carbons and graphites at high temperatures are found to be of great value in a large number of different applications.

In the field of nuclear energy, studies have now been devoted for a number of years to methods of manufacture of fuel elements for high-temperature reactors, said fuel elements being essentially formed by a dispersion in carbon of oxide particles, carbide particles, etc., of either fissionable or fertile materials. The carbonaceous material in which the dispersion is effected usually performs a double function: it endows the fuel element as a whole with mechanical strength, even at high temperatures, and transmits to the can the heat which is evolved in the granules of nuclear fuel.

Moreover, it is generally considered necessary to prevent the fission products from escaping into the coolant gas circuit which serves to recover the energy of the reactor, since this would result in disadvantages or complications in the operation of the reactor.

It has not thus far proved feasible to ensure fission product retention by employing for this purpose the carbon in which fuel granules are dispersed. The reason for this can be found in the conventional methods of fabrication which make use of conventional binding agents such as coal tar pitch products which are employed in the carbon industry or resins which perform the same function; after coking, such binding agents leave carbonaceous structures having high porosity. As a consequence, provision has to be made either for an impervious coating of the fuel granules or an impervious cladding of fuel elements in order to make good the above-mentioned deficiency of usual techniques, and this complicates the fabrication of nuclear fuels for high-temperature reactors and increases the cost price thereof to a marked extent.

The present invention is directed to a process which circumvents the disadvantages noted above and which is accordingly concerned with the fabrication of bodies formed by dispersion of refractory material within a carbonaceous matrix which is impervious to gases.

The process referred-to entails the stages which consist in preparing a powder containing said refractory material and having a granular size which is preferably smaller than 400µ, in adding to said powder at least one binder which is chemically compatible with the refractory material and which is chosen from the group consisting of polysaccharides, gums, mucilages, starches and alginates which are dispersed in water, drying oils, ethylcellulose which is diluted in a volatile solvent, in shaping the powder in the form of cohesive articles, in removing the water or solvent depending on the case and in forming the matrix by maintaining the articles in a gaseous hydrocarbon atmosphere at a temperature within the range of 800 to 1,000° C.

With regard to the preparation of the plastic paste, the choice of binder plays a very important part. It must permit of utilization in a small proportion and result after the coking process in a residue which is as small as possible (of the order of 28% by weight). The object thus contemplated is to obtain a structure which is free from very fine porosity and which, at the time of the thermal cracking process, permits the gaseous hydrocarbon to gain ready access to all the pores of the object which has been shaped. Binders which prove particularly suitable for the preparation of pastes in which the starting materials employed are refractory powders such as the oxides of actinide, lanthanide, beryllium, zirconium, aluminum or magnesium are: the polysaccharides, gums, mucilages, starches and alginates which are dispersed in water. These binders have a high swelling power in the presence of water, are added in a proportion which is less than 5% with respect to the weight of the starting powder, the proportion of water being approximately 25%.

In the case of hydrolyzable materials such as the carbides and nitrides of uranium and more generally of actinide or of lanthanide, drying oils are utilized as binder. Such oils may, for example, be either linseed oil or China wood oil (tung oil) which has been pre-thickened by blowing of hot air. Use can be made of ethylcellulose dissolved in a solvent which is more or less volatile according to the dimensions of the parts to be produced. Solvents which are particularly suitable for the purpose of dissolving ethylcellulose are, for example, ortho-dichlorobenzene, benzene and toluene. In this case, the drying process is carried out preferably in the mold at room temperature, either in vacuo or in free air. Ethylcellulose is to be added in a proportion which is smaller than 5% with respect to the weight of the starting powder and the solvent should be added in a proportion of the order of 10 to 20%.

Generally speaking, the utilization of drying oils and ethylcellulose proves of special value when it is desired to obtain good cohesion of the particles at the time of shaping of the plastic paste prior to the densification process or when the plastic paste is to be applied in thin layers (surface coatings, fuel jackets, etc.).

It is very important to note that it matters little whether graphite powder is added or not to the powdered refractory materials employed in the preparation of the plastic paste, at least insofar as concerns the mechanical strength and thermal shock resistance of the bodies obtained. A wholly unpredictable circumstance noted by the inventors as a result of their researches was that, even without any addition of graphite, it was possible to obtain excellent cohesion between the granules of refractory material and the pyrocarbon matrix obtained in the manner which has been indicated above. Consequently, the introduction at the moment of preparation of the paste of a predetermined quantity of graphite can be considered as a dilution of the refractory material by means of a charge whose properties are very similar to those of the pyrocarbon which forms the matrix. In other words, this amounts to increasing at will the percentage of carbonaceous material.

For the purpose of preparing refractory nuclear-fuel materials, there is added to the powder of refractory material a proportion of powdered graphite such that the atomic ratio of carbon atoms to fissionable atoms is of the order of 1:1,000.

As will be apparent, it is possible in a similar manner to replace the graphite either wholly or in part by any other refractory material such as, for example, beryllium oxide.

The particle size of the refractory materials employed can vary between a few microns to several hundred microns, but will preferably be smaller than 400µ.

There now follows a description of a number of different examples which are given without any limitation being implied and which relate to the practical application of the process in accordance with the invention for the fabrication of carbonaceous bodies formed by dispersion of refractory material within a pyrocarbon matrix which is impervious to gases. The practical arrangements which will be described in connection with these examples must be considered as forming part of the invention, it being understood that any equivalent arrangements could equally well be employed without thereby departing from the scope of this invention.

*Example 1*

Uranium oxide particles of spheroidal shape having a mean diameter of the order of $100\mu$ are admixed in a proportion of 13 parts of $UO_2$ per 100 parts of artificial graphite with 1.5 part of vegetable gum having high swelling power in the presence of water and having a coking yield of 28%. There is then added a suitable proportion of water (approximately 25 parts) in order to obtain a paste of thick consistency.

The paste is then compression-molded under a pressure of 80 bars in the shape of cylinders 10 millimeters in diameter and 20 millimeters in height.

After drying in free air for a period of 48 hours at room temperature, the agglomerates are placed in an electric muffle-type furnace in a natural-gas atmosphere at a pressure which is slightly higher than normal pressure (natural gas produced at Lacq in South-West France and having the following approximate composition: methane 92 to 96%, ethane 3 to 5%, propane 0.5 to 1%, nitrogen 0.5 to 2% and other impurities in considerably smaller proportions). The temperature is progressively increased to 900° C. and maintained at this value over a period of 250 hours whilst a supply of natural gas ensures the continuous renewal thereof.

After cooling, it is observed that a substantial quantity of pyrocarbon has been deposited both within the interior and at the surface of the agglomerates, the weight gain being approximately 90% of the initial weight.

Micrographic analysis of the products obtained shows a faultless insertion of the uranium oxide particles within a continuous pyrocarbon matrix. The matrix has a density of 1.85 g./cc. and proves excellent from the point of view of impermeability; in fact, after a standard test consisting in chemical attack by boiling normal nitric acid for a period of 20 hours, it is found that only 0.0001% of the quantity of $UO_2$ initially contained in the treated sample has passed into solution.

Moreover, the product obtained is endowed with the essential characteristics of a fuel agglomerate which is intended for utilization at high temperature: in particular, the appearance and integrity of the pyrocarbon matrix remain unchanged after the usual thermal cycling tests up to temperatures of 1500° C., such temperatures being consequently considerably higher than those which prevail at the time of formation of the matrix.

It will be noted that the process of fabrication according to the invention provides the double advantage:

Of considerably simplifying the manufacturing cycle inasmuch as a preliminary coating of the particles with an impervious layer of pyrocarbon or like material serves no useful purpose;

Of requiring only the minimum of handling of fissionable granules, thereby greatly reducing the dangers of contamination which cause considerable inconvenience in this type of application.

*Example 2*

Zirconium oxide particles of spheroidal shape and having a diameter of the order of $80\mu$ are admixed in a proportion of 100 parts per 2 parts of rice starch; 30 parts of water are then added in order to obtain a paste of thick consistency.

As in the previous example, cylinders 20 millimeters in diameter and 30 millimeters in height are compression-molded under a pressure of 50 bars. The drying process and thermal treatment in natural-gas atmosphere (natural gas produced at Lacq) are carried out under the same conditions as those described in the previous example. These operations last a total period of 280 hours and the overall weight gain is 54%. The parts obtained have an electrical resistivity of 5,000 microhms/cm./cm.$^2$ at room temperature, which is lower by several orders of magnitude than that of parts of sintered zirconium. Micrographic analysis shows that the zirconium particles are inserted in a fully developed pyrocarbon lattice. Resistance to repeated thermal cycling up to high temperatures of the order of 2,000° C. is excellent, as is also the compatibility of the refractory material with the matrix, as it has been possible to verify by means of micrographic analyses.

This material is well suited to the fabrication of electrodes for direct magnetohydrodynamic conversion and, in particular, exhibits electrical properties which are decidedly better than those of sintered zirconium electrodes while also being considerably cheaper to produce; the resistance of these electrodes to corrosion by gases under operating conditions is in addition considerably higher than that of parts which are solely made up of graphite or of pyrocarbon.

*Example 3*

There is first prepared a homogeneous mixture of uranium monocarbide granules (diameter comprised between 200 and $400\mu$) and nuclear-grade graphite in powdered form (particle diameter smaller than $80\mu$). In this mixture, the atomic ratio $C/U$ is such as to ensure that the ratio in the end product is of the order of 1:1,000. There is then added a proportion of 15% pre-thickened China wood oil (tung oil). A cylinder 20 millimeters in diameter and 20 millimeters in height is molded from the paste under a pressure of 60 kg./cm.$^2$. The drying operation takes place in an oven at 40° C. The aglomerate is finally processed for a period of 300 hours at 875° C. in a flow of natural gas which circulates at a velocity of 1 cm. sec.$^{-1}$. The weight gain resulting from the formation of the carbonaceous matrix is 55%.

*Example 4*

The operation first consists in agglomerating uranium mononitride granules which are dispersed, as in the previous example, in nuclear-grade graphite powder. The plastic paste is obtained in this instance by adding 2% diethylcellulose which is dissolved in a sufficient quantity of ortho-dichlorobenzene. A cylinder 10 millimeters in diameter and 20 millimeters in height is molded under a pressure of 40 kg./cm.$^2$. Drying is then performed in the mold under a vacuum of 10 millimeters of mercury at ordinary temperature. A processing time of 300 hours at 900° C. in natural gas results in a weight gain of 60%.

It can be seen from the foregoing examples that the applications of the process according to the invention cover a wide range both in the field of nuclear energy and in other fields.

In the first case, the practical operation of the process which is claimed makes it possible to obtain fuel elements wherein the pyrocarbon matrix ensures at the same time the mechanical strength of the whole, the transfer of heat and, by virtue of the impermeability provided by the characteristic method of fabrication according to the invention, further ensures effective fission product retention. The refractory material can be made up of oxide particles, carbide particles, nitride particles, silicide particles and so forth, whether considered alone or in combination, of either fissionable or fertile elements, these compounds being combined if so required with non-combustible refractory materials.

In cases of extra-nuclear applications, the fabrication process according to the invention is advantageous from two standpoints:

Said process permits of easy and economical shaping by insertion in the pyrocarbon matrix of highly refractory materials, whereas the usual methods for processing such materials (sintering, for example) cannot easily be applied or else are too costly, as a result of the very high temperatures and in some cases very high pressures which it is necessary to employ;

Said process permits the fabrication of composite bodies which consists of a mixture of refractory material and pyrocarbon and which, by virtue of the structure and impermeability of the pyrocarbon matrix, accordingly afford improved mechanical properties as well as resistance to corrosion by gases at high temperature which are not possessed by composite bodies such as are prepared in accordance with the traditional methods of the carbon industry, which always result in carbonaceous structures having a more or less high porosity.

It will be understood that the present invention is not limited to the modes of application which have just been described but that, on the contrary, all alternative forms are included within the scope of the invention. It accordingly follows that the nature of the refractory materials employed as well as the applications herein-above referred-to have been given solely by way of example, that parts of any desired shape having as a base either one refractory material or a mixture of a number of refractory materials can be produced by means of the process of the invention, and that such parts can be employed as functional or structural elements adapted to conditions of utilization at very high temperatures such as, for example, space-flight applications. Furthermore, although the use of natural gas as produced at Lacq in South-West France has proved to be particularly advantageous within the framework of the French economy, it must nevertheless be made clear that, under other economic conditions, it would be entirely feasible to employ any other phase consisting of one or a number of hydrocarbons which are in gaseous form at processing temperature and which can if necessary be mixed with inert gases.

What we claim is:

1. In a process for the fabrication of an article formed by dispersion of a refractory material within a carbonaceous matrix which is impervious to gases, the stages which consist in mixing with a powder containing said refractory material and having a particle size which is preferably smaller than $400\mu$ at least one binder which is chosen from the group consisting of polysaccharides, gums, mucilages, starches and alginates which are dispersed in water to form a paste, pressing said paste into a compact cohesive article, removing the water, and then impregnating and sealing said compact with carbon and forming said matrix by maintaining said article in a gaseous hydrocarbon atmosphere at a temperature within the range of 800 to 1,000° C.

2. Process as defined in claim 1, wherein the refractory material is chosen from the group consisting of the oxides of actinide, of lanthanide, of beryllium, of zirconium, of aluminum and of magnesium.

3. Process as defined in claim 1, wherein the binder is added to said powder in a proportion which is smaller than 5% by weight of the powder.

4. Process as defined in claim 1, wherein the binder contains a proportion of water of the order of 25% by weight of the powder.

5. Process as defined in claim 1, wherein said gaseous hydrocarbon is an unpurified natural gas.

6. Process as defined in claim 1, wherein the refractory material consists of a refractory nuclear fuel and the powder contains a proportion of powdered graphite such that the atomic ratio of carbon atoms to fissionable atoms is of the order of 1:1,000.

References Cited by the Examiner
UNITED STATES PATENTS

| | | | |
|---|---|---|---|
| 3,079,316 | 2/1963 | Johnson | 176—91 |
| 3,122,595 | 2/1964 | Oxley | 176—91 |
| 3,135,665 | 6/1964 | Koutz et al. | 176—91 |
| 3,158,547 | 11/1964 | Smith | 264—.5 |
| 3,164,487 | 1/1965 | Carley-Macauly et al. | 264—.5 |
| 3,166,614 | 1/1965 | Taylor | 264—.5 |
| 3,212,989 | 10/1965 | Fitzer et al. | 176—67 |

CARL D. QUARFORTH, *Primary Examiner.*

L. DEWAYNE RUTLEDGE, *Examiner.*